May 26, 1925.
J. J. BAYER
COMBINED DRILL AND TAP
Filed June 12, 1923
1,539,628
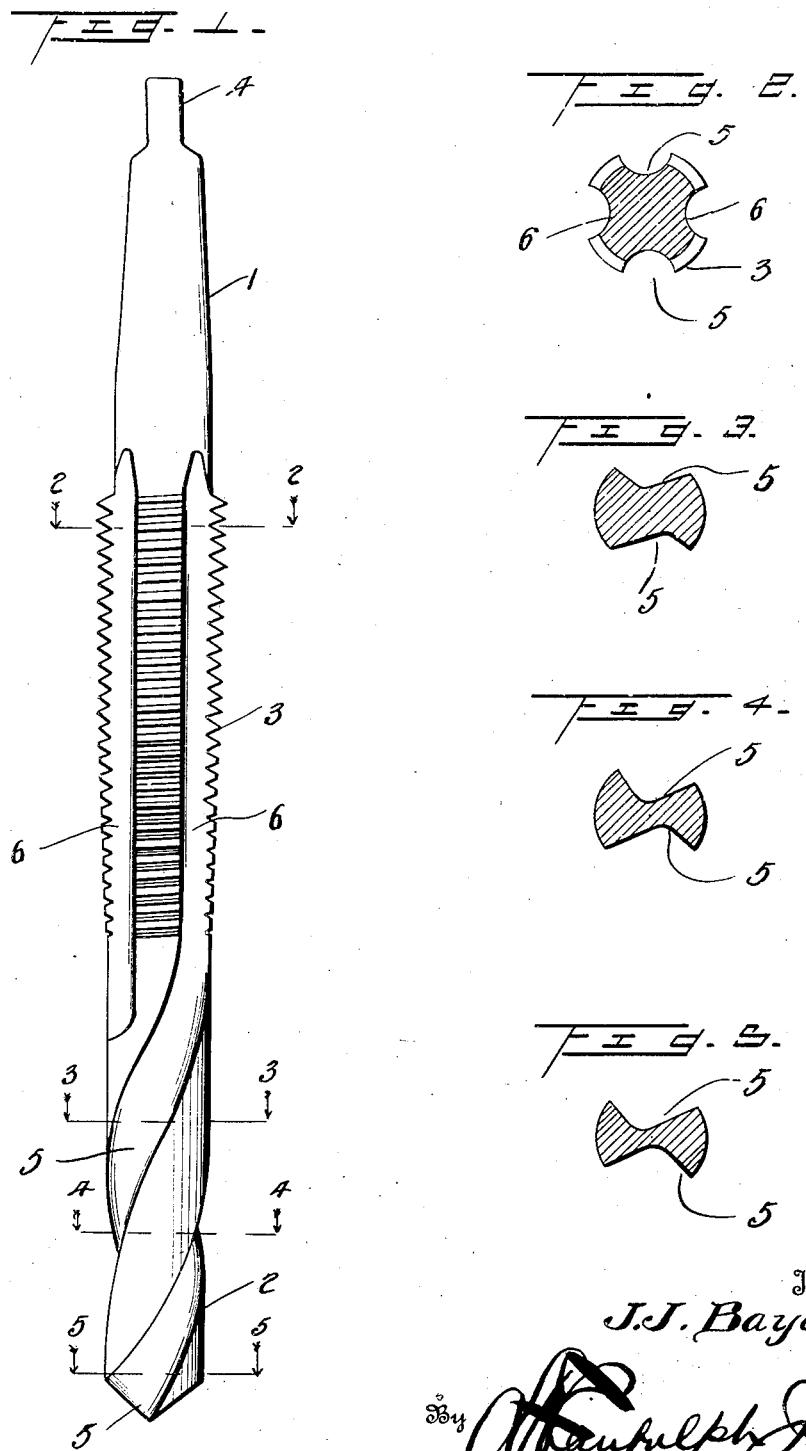

Patented May 26, 1925.

1,539,628

UNITED STATES PATENT OFFICE.

JOHN J. BAYER, OF BROOKLYN, NEW YORK.

COMBINED DRILL AND TAP.

Application filed June 12, 1923. Serial No. 644,949.

*To all whom it may concern:*

Be it known that I, JOHN J. BAYER, a citizen of the United States, residing at Brooklyn, in the county of Kings and State of New York, have invented certain new and useful Improvements in Combined Drills and Taps; and I do hereby declare the following to be a full, clear, and exact description of the invention, such as will enable others skilled in the art to which it appertains to make and use the same.

The invention has for its object to provide a tool which will enable an opening to be drilled and the walls of the opening threaded, thereby obviating the use of independent tools and separate operations, the sides of the bit merging into the sides of the tap so that the work of drilling and threading may be continuous.

Other objects and advantages will be apparent and suggest themselves as the nature of the invention is understood.

While the drawings illustrate an embodiment of the invention it is to be understood that in adapting the same to meet different conditions and requirements, various changes in the form, proportions and minor details of construction may be resorted to without departing from the nature of the invention.

Referring to the accompanying drawings forming a part of the application:

Figure 1 is a view in elevation of a combined drill and tap embodying the invention, Figure 2 is a horizontal section on the line 2—2 of Figure 1, and Figures 3, 4 and 5 are sectional views on the lines 3—3, 4—4 and 5—5 of Figure 1, respectively.

Corresponding and like parts are referred to in the following description and designated in the several views of the drawings by like reference characters.

The tool comprises a stem having a shank 1 at one end and a bit 2 at the opposite end, the intermediate portion 3 being threaded to provide the tap. The shank 1 has a Morse taper and terminates in an angular portion 4 to be fitted to a chuck or other operating tool. The bit 2 is of the ordinary twist drill form, the flutes or grooves 5 gradually decreasing in depth and width towards the threaded portion 3, whereby provision is had for additional grooves 6, whereby to provide the ordinary four thread sections of the tap. The grooves 6 have their origin in the upper or base portion of the bit and terminate at the inner end or base of the shank 1. The cutting edges of the drill point and the thread sections of the tap merge, as indicated most clearly in Figure 1, and as a result the tap is gradual in its action and follows close upon the drill and as a result the work of drilling an opening and threading the same is continuous.

What is claimed is:

A combined drill and tap comprising a stem having a twist drill point at one end, the grooves of which gradually decrease in depth and terminate in oppositely disposed longitudinal grooves and having other intermediate longitudinal grooves starting at the inner end of the drill point and terminating at the inner end of the shank and having longitudinal portions separated by the longitudinal grooves, said portions being provided with thread sections which merge into the cutting edges of the drill point, said longitudinal grooves being of the depth and width of the inner ends of the grooves of the twist drill point.

In testimony whereof I affix my signature in presence of two witnesses.

JOHN J. BAYER.

Witnesses:
 WALTER N. ROZELL,
 EDWARD A. CHRISTIANSON.